US011945213B2

(12) United States Patent
Hamada et al.

(10) Patent No.: US 11,945,213 B2
(45) Date of Patent: Apr. 2, 2024

(54) LIQUID DISCHARGE APPARATUS

(71) Applicant: CANON KABUSHIKI KAISHA, Tokyo (JP)

(72) Inventors: Takuya Hamada, Yokohama (JP); Kenichi Ogawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/163,638

(22) Filed: Feb. 2, 2023

(65) Prior Publication Data

US 2023/0173827 A1 Jun. 8, 2023

Related U.S. Application Data

(63) Continuation of application No. 17/167,982, filed on Feb. 4, 2021, now Pat. No. 11,584,143, which is a continuation of application No. 16/238,931, filed on Jan. 3, 2019, now Pat. No. 10,940,701.

(30) Foreign Application Priority Data

Jan. 16, 2018 (JP) ................................ 2018-005079
Mar. 16, 2018 (JP) ................................ 2018-049417

(51) Int. Cl.

*B41J 2/01* (2006.01)
*B41J 2/04* (2006.01)
*B41J 11/00* (2006.01)
*B41M 7/00* (2006.01)

(52) U.S. Cl.

CPC ............. *B41J 11/0024* (2021.01); *B41J 2/01* (2013.01); *B41J 2/04* (2013.01); *B41M 7/00* (2013.01); *B41M 7/0054* (2013.01); *B41M 7/009* (2013.01)

(58) Field of Classification Search

CPC ... B41J 2/01; B41J 2/04; B41J 11/0024; B41J 11/00242; B41J 11/00244; B41M 7/00; B41M 7/0054; B41M 7/009

See application file for complete search history.

(56) References Cited

U.S. PATENT DOCUMENTS

2008/0166495 A1* 7/2008 Maeno ............... B41J 11/00212 427/493
2011/0069109 A1* 3/2011 Tojo ..................... C09D 11/322 347/21
2015/0029255 A1* 1/2015 Ohnishi ............ B41J 11/00244 347/102

FOREIGN PATENT DOCUMENTS

CN 103249568 A * 8/2013 ................ B41J 2/01
EP 3073330 A1 * 9/2016 ............. G03G 15/20
JP H11161042 A * 6/1999 ............. G03G 15/16
JP 2003191452 A * 7/2003 ................ B41J 2/01

* cited by examiner

*Primary Examiner* — Anh T Vo

(74) *Attorney, Agent, or Firm* — Canon U.S.A., Inc. IP Division

(57) ABSTRACT

A liquid discharge apparatus includes a conveying part configured to convey a medium in a conveying direction. A discharge head is configured to discharge a droplet onto a medium carried by the conveying part. A heating part is arranged at the downstream of the discharge head and configured to heat a medium while contacting with the medium attached with a droplet discharged by the discharge head. The heating part is arranged at a position contacting with at least part of the droplet present on the surface of the medium.

29 Claims, 7 Drawing Sheets

LIQUID DISCHARGE APPARATUS

CROSS-REFERENCE TO RELATED APPLICATIONS

The present application is a Continuation of U.S. patent application Ser. No. 17/167,982, filed on Feb. 4, 2021; which is a Continuation of U.S. patent application Ser. No. 16/238,931, filed on Jan. 3, 2019, which claims priority from Japanese Patent Application No. 2018-005079 filed Jan. 16, 2018 and Japanese Patent Application No. 2018-049417 filed Mar. 16, 2018. These applications are hereby incorporated by reference herein in their entireties.

BACKGROUND OF THE DISCLOSURE

Field of the Disclosure

The disclosure relates to a liquid discharge apparatus.

Description of the Related Art

Japanese Patent Laid-Open No. 2004-188867 discloses a liquid discharge apparatus in which a heating roller is arranged at the downstream of an image forming part and the heating roller carries a medium while contacting with the surface of the medium. The liquid discharge apparatus in Japanese Patent Laid-Open No. 2004-188867 heats ink via a medium in the above configuration, thereby increasing an image forming speed.

Japanese Patent Laid-Open No. 2004-188867 discloses that the heating roller is arranged at the downstream of the image forming part in the medium conveying direction. However, Japanese Patent Laid-Open No. 2004-188867 does not describe an arrangement of the heating roller for increasing an image density with a less amount of ink.

SUMMARY OF THE DISCLOSURE

An aspect of the disclosure is to provide a liquid discharge apparatus capable of increasing an image density with a less amount of droplets while improving a drying speed of droplets attached on a medium.

A liquid discharge apparatus according to the disclosure includes a conveying part configured to convey a medium in a conveying direction, a discharge head configured to discharge a droplet onto a medium carried by the conveying part, and a heating part arranged at the downstream of the discharge head and configured to heat a medium while contacting with the medium attached with a droplet discharged by the discharge head, in which the heating part is arranged at a position contacting with at least part of the droplet present on the surface of the medium.

Further features and aspects of the disclosure will become apparent from the following example embodiments (with reference to the attached drawings).

DESCRIPTION OF THE EMBODIMENTS

First to sixth example embodiments of the disclosure will be described below.

First Example Embodiment

Figure 1:
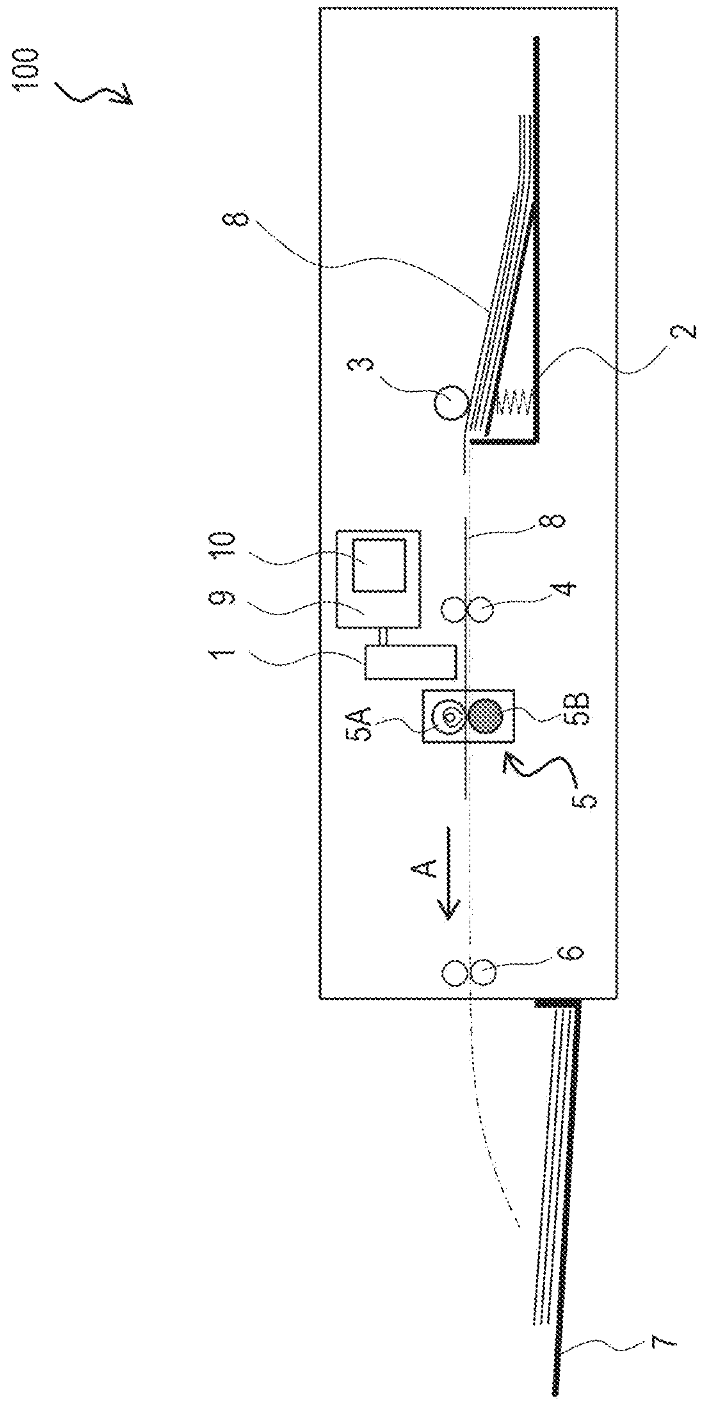
FIG. 1 is a diagram of an entire recording apparatus according to a first example embodiment.

FIG. 1 is a diagram (cross-section view) of an entire inkjet recording apparatus 100 (example liquid discharge apparatus, denoted as recording apparatus 100 below) according to the present embodiment. The recording apparatus 100 is an inkjet recording apparatus configured to form an image on a recording medium 8 (example medium) by giving ink as recording material onto the recording medium 8.

As illustrated in FIG. 1, the recording apparatus 100 includes a recording head 1 (example discharge head), a paper feeding cassette 2, a paper feeding roller 3, a conveying roller 4 (example conveying part), a heating part 5, a paper discharge roller 6, a paper discharge tray 7, a control part 9, and an operation part 10. The recording head 1 is a full-line type head (inkjet head) including a discharge port configured to discharge an ink drop Id (example droplet, see FIG. 4). An ink drop Id means a drop-like ink in the present specification. An example droplet may be a liquid other than ink.

When printing is performed by the recording apparatus 100 according to the present embodiment, a recording medium 8 (example medium) picked up by the paper feeding roller 3 from the paper feeding cassette 2 is carried by the conveying roller 4 in the conveying direction (in the direction by an arrow A in FIG. 1), and an image is formed thereon by the recording head 1. The recording medium 8 with the image formed thereon then passes through the heating part 5 while the ink on the recording medium 8 is being dried by the heating part 5, is carried by the paper discharge roller 6, and is placed on the paper discharge tray 7.

The recording apparatus 100 may be applied to apparatuses such as facsimile having a printer, a copying machine, and a communication system, and a word processor having a printer part. The recording apparatus 100 may be further applied to industrial recording apparatuses combined with various processing apparatuses in a complexed manner. For example, the recording apparatus 100 may be applied for biochip manufacture, electronic circuit printing, semiconductor substrate manufacture, 3D printer, and the like.

Figure 2:
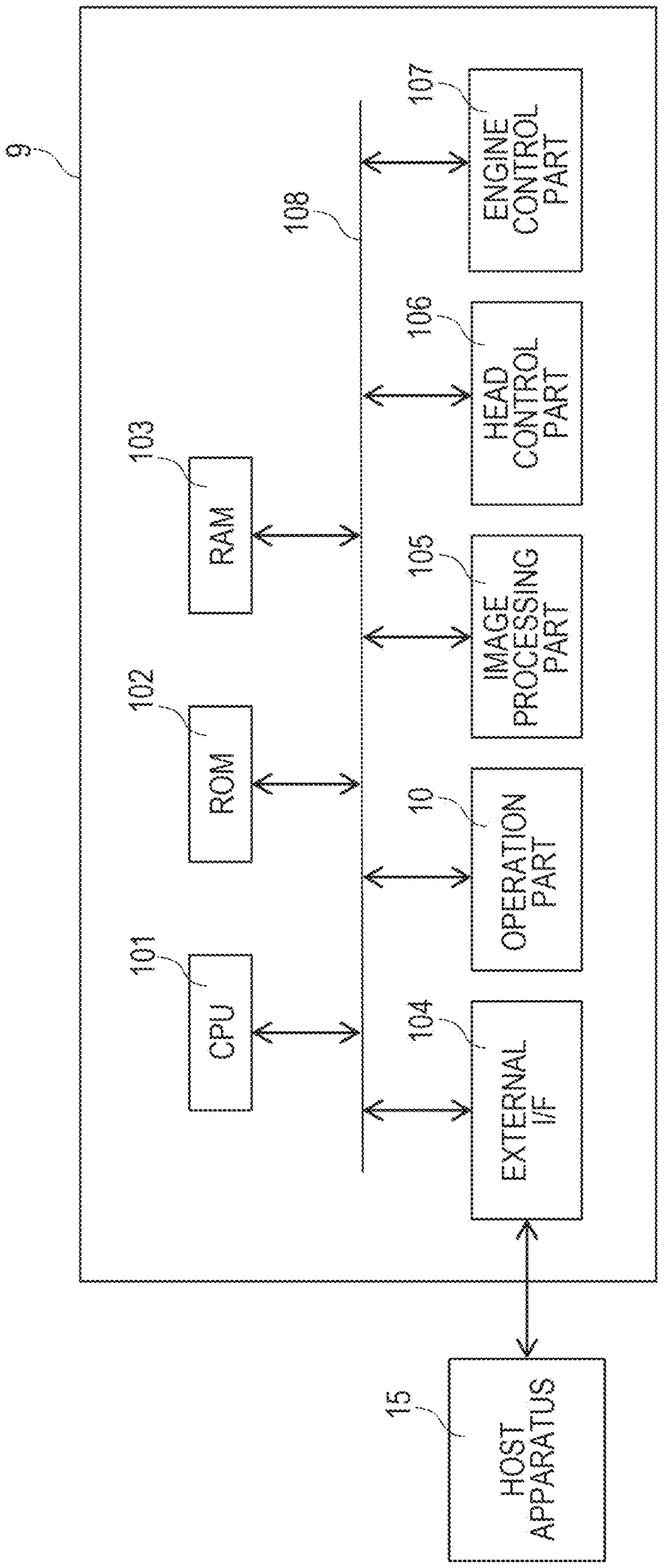
FIG. 2 is a block diagram of a control part in the recording apparatus according to the first embodiment, and a host apparatus.

FIG. 2 is a block diagram illustrating a concept of the control part 9 communicable with a host apparatus 15. The control part 9 is configured of a CPU 101, a ROM 102, a RAM 103 (example storage part), an image processing part 105, a head control part 106, and an engine control part 107 by way of example.

The central processing unit (CPU) 101 totally controls the operations of each unit in the recording apparatus 100. The ROM 102 (storage part) stores therein programs executed by the CPU 101, or fixed data required for various operations in the recording apparatus 100 (for example, data on the type of a recording medium 8 housed in the paper feeding cassette 2). The RAM 103, as a work area of the CPU 101 or a temporary storage region for various items of received data, stores various items of setting data. The operation part 10 is an I/O interface with a user, and includes an input part such as hardware keys or touch panel, a display configured to present information, and an output part such as speech generator. A unit requiring a high-speed data processing is provided with a dedicated processing part. The image processing part 105 performs image processing on image data handled by the recording apparatus 100. The image processing part 105 converts a color space (such as YCbCr) of input image data into a standard RGB color space (such as sRGB). The recording data acquired by the image processing is stored in the RAM 103. The head control part 106 drives and controls the recording head 1 depending on the recording data in response to a control command received from the CPU 101 or the like. The engine control part 107 controls the conveying mechanism in the recording apparatus, a heater of the heating part 5, and the conveying roller 4 and the paper discharge roller 6.

Operation of each unit is controlled by the engine control part 107 in response to a command from the CPU 101. An external I/O 104 is an interface (I/F) configured to connect the control part 9 to the host apparatus 15, which is a local I/F or a network I/F. The above components are connected via a system bus 108.

The host apparatus 15 serves as an image data supply source in order to cause the recording apparatus 100 to perform the image forming operation. The host apparatus 15 may be a general-purpose or dedicated computer, or may be a dedicated image device such as image capture having an image reader, digital camera, or photo-storage.

Figure 3:
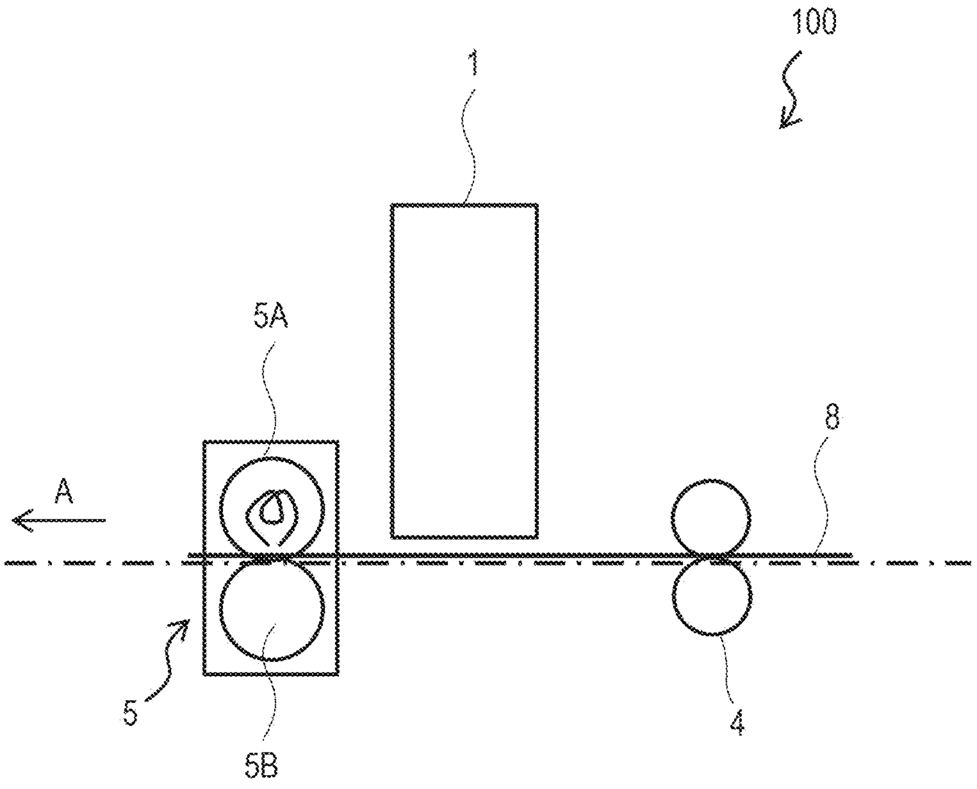
FIG. 3 is an enlarged diagram of an image forming part and an ink drying part according to the first embodiment.

The heating part 5 is a heating unit configured to rapidly dry an ink drop Id attached on the surface of a recording medium 8. The heating part 5 is arranged at the downstream of the recording head 1 in the conveying direction of the recording medium 8. As illustrated in FIG. 3, the heating part 5 has a heat roller 5A (example heating body) and a pinch roller 5B (example conveying body). The heat roller 5A houses a heater (such as halogen heater) therein. The pinch roller 5B is arranged at the downstream of the heat roller 5A, and forms a nip with the heat roller 5A. The heat roller 5A and the pinch roller 5B sandwich and convey a recording medium 8 by the nip while rotating about a first axis and a second axis, respectively, in mutually reverse directions. With the above configuration, the heating part 5 heats the recording medium 8 while contacting with the recording medium 8 attached with the ink drop Id discharged by the recording head 1. More specifically, the heating part 5 is arranged at a position contacting with at least part of an ink drop Id present on the surface of a recording medium 8, and heats the recording medium 8 (see FIG. 4 descried below). Additionally, the technical meaning of the position of the heating part 5 will be described below.

The ink used in the recording apparatus 100 according to the present embodiment will be described below.

It is preferable that when a recording medium 8 attached with an ink drop Id discharged by the recording head 1 reaches the heating part 5, as little ink as possible permeates the inside of the recording medium 8. The surface tension of the ink can be controlled by use of a surfactant. The surface tension of the ink can be controlled to a desired value by adjusting the amount or type of a water-soluble organic solvent in the ink. Additionally, similar components to the conventional ink may be employed.

Each component of the ink used in the present embodiment will be described below.

According to the present embodiment, a pigment dispersion liquid A (detailed below) as color material, glycerin, polyethylene glycol 600, and water are mixed at a rate of 50:10:10:30(%). The surface tension of the mixed liquid is adjusted by the amount of surfactant to be added: EMULMIN L90S (manufactured by Sanyo Chemical Industries, Ltd.) to be 30 to 45 [mN/m], and the mixed liquid is sufficiently stirred. The stirred liquid is pressurized and filtered to be adjusted by a micro filter (manufactured by FUJIFILM Corporation) with a pore size of 3.0 thereby manufacturing the ink.

Preparation of the pigment dispersion liquid A will be described herein.

Into 5.5 g of water, 5 g of concentrated hydrochloric acid is solved, and 1.5 g of 4-aminophthalic acid is added to the solution cooled at 5° C. The container containing this solution is then put into an ice bath and stirred so that the solution is always kept at 10° C. or lower, and a solution solved with 1.8 g of sodium nitrite in 9 g of water at 5° C. is added to this solution and the resultant solution is stirred for 15 minutes. The solution is added with 6 g of carbon black with a specific area of 220 $m^2/g$ and DBP oil absorption of 105 mL/100 g while being stirred, and is stirred for another 15 minutes. The resultant slurry is filtered by filter paper (product name: standard filter paper No. 2; manufactured by ADVANTEC CO., LTD), and then the particles are sufficiently cleansed by water from the slurry and the particles are dried by an oven at 110° C. thereby to prepare self-dispersible carbon black B. Further, the resultant self-dispersible carbon black B is added with water and is dispersed to be at 15% by mass of pigment concentration, thereby preparing the dispersion liquid. With the above method, there is obtained a pigment dispersion liquid in which self-dispersible carbon black with —C6H3-(COONa)2 group introduced into carbon black particle surface is dispersed in water.

A recording medium 8 (paper to be evaluated) used in the recording apparatus 100 according to the present embodiment is assumed as PB paper (manufactured by Cannon Inc.), Océ Recycle Classic (manufactured by Canon Inc.), and Bright White (manufactured by Hewlett-Packard Company).

The heat roller 5A used in the recording apparatus 100 according to the present embodiment will be described below.

There is fear that ink is attached on the surface of the heat roller 5A when the recording medium 8 passes through the heating part 5 after an ink drop Id is attached on a recording medium 8 in the present embodiment. However, the inventors of the present application have found that ink is not transferred to the heat roller 5A by further increasing the dynamic surface tension of the ink than the surface energy of the roller surface of the heat roller 5A when an ink drop Id attached on a recording medium 8 reaches the heat roller 5A (denoted as relationship 1 below). The ink and the heat roller 5A used in the present embodiment have the relationship 1.

A heat-resistant film can efficiently process moisture in a short time, and thus is preferable for a material of the roller surface of the heat roller 5A, and polyimide, PFA, PTFE, silicon, and the like can be employed. The material of the roller surface of the heat roller 5A according to the present embodiment is assumed as PFA=tetrafluoroethylene perfluoroalkyl vinyl ether copolymer. If the ink and the heat roller 5A meet the relationship 1, the materials of the ink and the heat roller 5A may be other than the example materials of the present embodiment.

The operation of the recording apparatus 100 according to the present embodiment will be described below with reference to FIG. 4 and FIG. 5.

Figure 4:
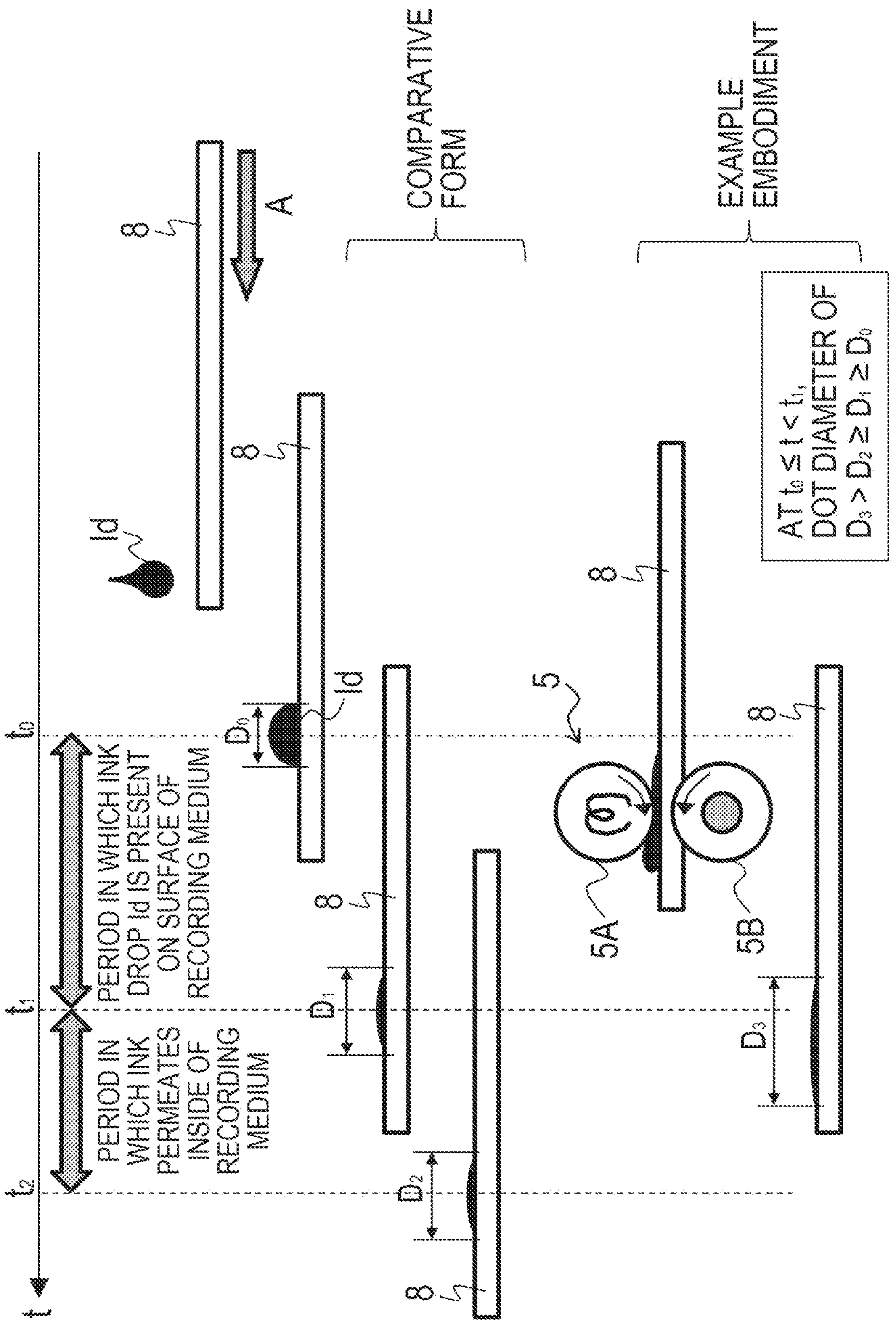
FIG. 4 is an explanatory diagram of a relationship between ink permeation state and crush effect by a heating part.

FIG. 4 is a diagram for explaining the events for a permeation state of ink drop Id, and dot crushing (to crush an attached ink drop Id and to enlarge its attached area) at the heating part 5. FIG. 5 is a graph for explaining an elapsed time and an image density after an ink drop Id attaches on a recording medium 8 in the present embodiment and in a comparative form.

The description will be made assuming that the recording apparatus 100 according to the present embodiment does not include the heating part 5 (denoted as comparative form below).

An ink drop Id discharged toward a recording medium 8 by the recording head 1 at time t=0 is attached on the surface (top surface) of the recording medium 8 at elapsed time $t_0$. In this case, the dot diameter of the ink drop Id attached on the surface of the recording medium 8 is assumed as $D_0$.

The ink drop Id attached on the recording medium 8 then starts permeating the inside of the recording medium 8 while spreading on the surface of the recording medium 8 over time. The ink drop Id is not present on the surface of the recording medium 8 at elapsed time $t_1$. In this case, the dot diameter of the ink on the surface of the recording medium 8 is assumed as $D_1$ ($>D_0$).

Then, the ink continues to further permeate the inside of the recording medium 8, and completes the permeation at elapsed time $t_2$ so that the color material completely fixes into the recording medium 8. In this case, the dot diameter of the ink on the surface of the recording medium 8 is assumed as $D_2$ ($\geq D_1$).

Figure 5:
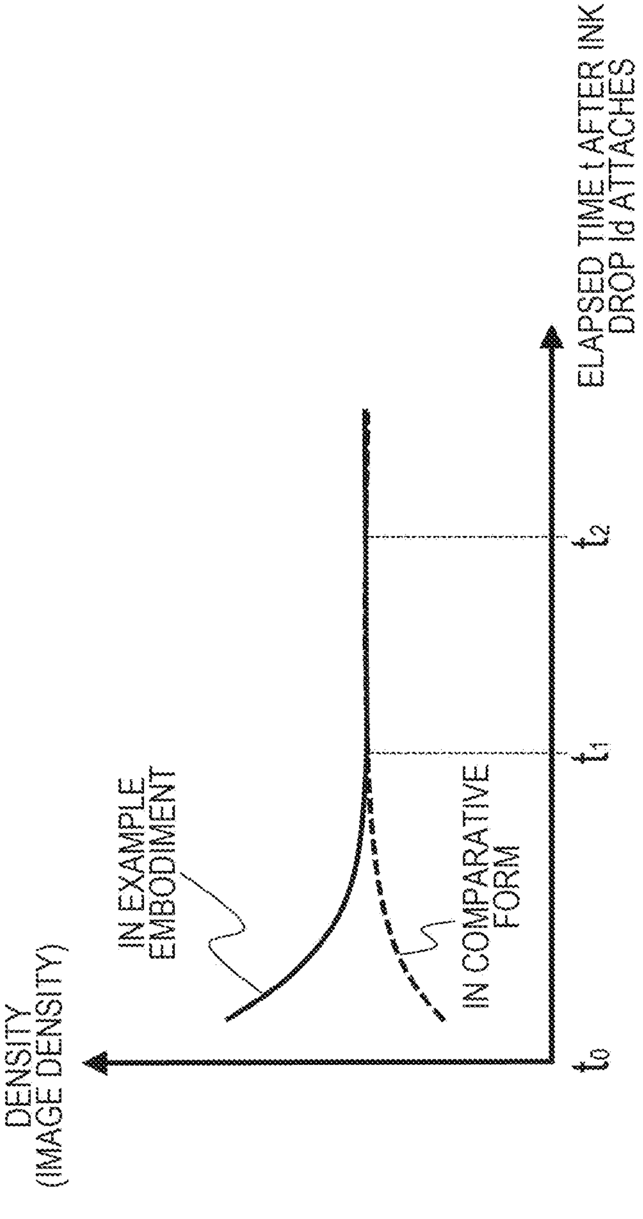
FIG. 5 is a graph for explaining time and image density after an ink drop is attached on a recording medium.

In the comparative form, as illustrated in FIG. 5, while the dot diameter $D_0$ of the ink drop Id at elapsed time $t_0$ changes to the dot diameter $D_1$ at elapsed time $t_1$, an area factor (coverage rate at which the color material covers the surface of the recording medium 8) increases and the image density also increases.

In the comparative form, however, as illustrated in FIG. 5, if the dot diameter does not increase while the area factor is less than 100%, the image density stops increasing.

The relationship between elapsed time and image density in the present embodiment will be described below.

In the present embodiment, as illustrated in FIG. 4, a recording medium 8 reaches the nip of the heating part 5 between elapsed time $t_0$ and elapsed time $t_1$. That is, the heating part 5 is arranged at a position contacting with at least part of an ink drop Id present on the surface of the recording medium 8. Thus, in the present embodiment, the ink drop Id is forcibly crushed and heated before elapsed time $t_1$. Consequently, the dot diameter $D_3$ at elapsed time $t_1$ in the present embodiment is larger than the dot diameter $D_1$ at elapsed time $t_1$ in the comparative form (the area factor increases). For example, in the present embodiment, the image density can be increased even with a less amount of ink drop Id than in the comparative form.

According to the present embodiment, when a solid image is formed in a certain area on a recording medium 8, an ink drop Id is discharged such that the coverage rate of the ink drop Id in the certain area on the recording medium 8 is less than 100% when the ink drop Id attaches. In the present embodiment, then the coverage rate of the ink drop Id in the certain area on the recording medium 8 is set to be 100% after the recording medium 8 passes through the heating part 5. That a solid image is formed in a certain area on a recording medium 8 means that an ink drop Id is discharged to every position where the ink drop Id is to be attached in a certain area on a recording medium 8 (a position corresponding to each pixel defined by resolution).

Thus, according to the present embodiment, it is possible to increase the image density with a less amount of ink drops Id while improving the drying speed of ink drops Id attached on a recording medium 8.

The amount of ink drop Id to be crushed depends on the amount of ink remaining on the surface of a recording medium 8.

The amount of ink drop Id to be crushed is the amount of ink to be crushed. Thus, the amount of ink drop Id to be crushed is proportional to the area obtained by subtracting the attached area on the surface of a recording medium 8 immediately before an ink drop Id is crushed from the attached area on the surface of the recording medium 8 immediately after the ink drop Id is crushed. As the time after an ink drop Id attaches on a recording medium 8 and until the recording medium 8 reaches the nip of the heating part 5 is shorter, the amount of ink drop Id to be crushed is larger, and the density is higher (see FIG. 5). Consequently, the line width or character quality can be further deteriorated than in the comparative form in which the dot crushing is not performed. It is therefore preferable to adjust the amount of ink drop Id to be crushed in consideration of a balance between an increase in area factor and a deterioration in line width and character quality. The adjustment in this case may be determined on the basis of a result obtained by observing the area factor by a light microscope or scanner or measuring the density by a colorimeter, and observing a change in line width or character quality by the light microscope or scanner.

Second Example Embodiment

A second example embodiment will now herein be described below. The differences from the first embodiment will be described below. The recording apparatus (not illustrated) according to the present embodiment is configured such that the revolutions of the conveying roller 4 and the paper discharge roller 6 can be changed by the engine control part 107 in the control part 9. Thus, according to the present embodiment, the conveying roller 4 and the paper discharge roller 6 can change the setting of conveying speed of a recording medium 8. The present embodiment is similarly configured to the first embodiment in other than the above points.

According to the present embodiment, the conveying speed of a recording medium 8 is changed and the amount of ink drop Id to be crushed is adjusted. As described in the first embodiment, the amount of ink drop Id to be crushed depends on the amount of ink remaining on the surface of the recording medium 8. That is, as the time after an ink drop Id attaches on a recording medium 8 and until the recording medium 8 reaches the nip of the heating part 5 is shorter, the amount of ink drop Id to be crushed is larger and the image density is higher (see FIG. 5).

Thus, according to the present embodiment, when the amount of ink drop Id to be crushed is to be increased, the control part 9 controls and increases the revolutions of the conveying roller 4 and the paper discharge roller 6 thereby to increase the conveying speed of a recording medium 8. In this case, the time after an ink drop Id attaches on a recording medium 8 and until the recording medium 8 reaches the nip of the heating part 5 is shorter by the increase in the conveying speed, and thus the amount of ink drop Id to be crushed can be increased. When the amount of ink drop Id to be crushed is to be decreased, the control part 9 controls and decreases the revolutions of the conveying roller 4 and the paper discharge roller 6, thereby decreasing the amount of ink drop Id to be crushed. From the above, the setting of conveying speed of a recording medium 8 is changed so that the conveying roller 4 can adjust the amount of ink drop Id to be crushed in the present embodiment.

The present embodiment is advantageous in that it can obtain the effects of the first embodiment without changing the positional relationship between the recording head 1 and the heating part 5.

Third Example Embodiment

Figure 6:
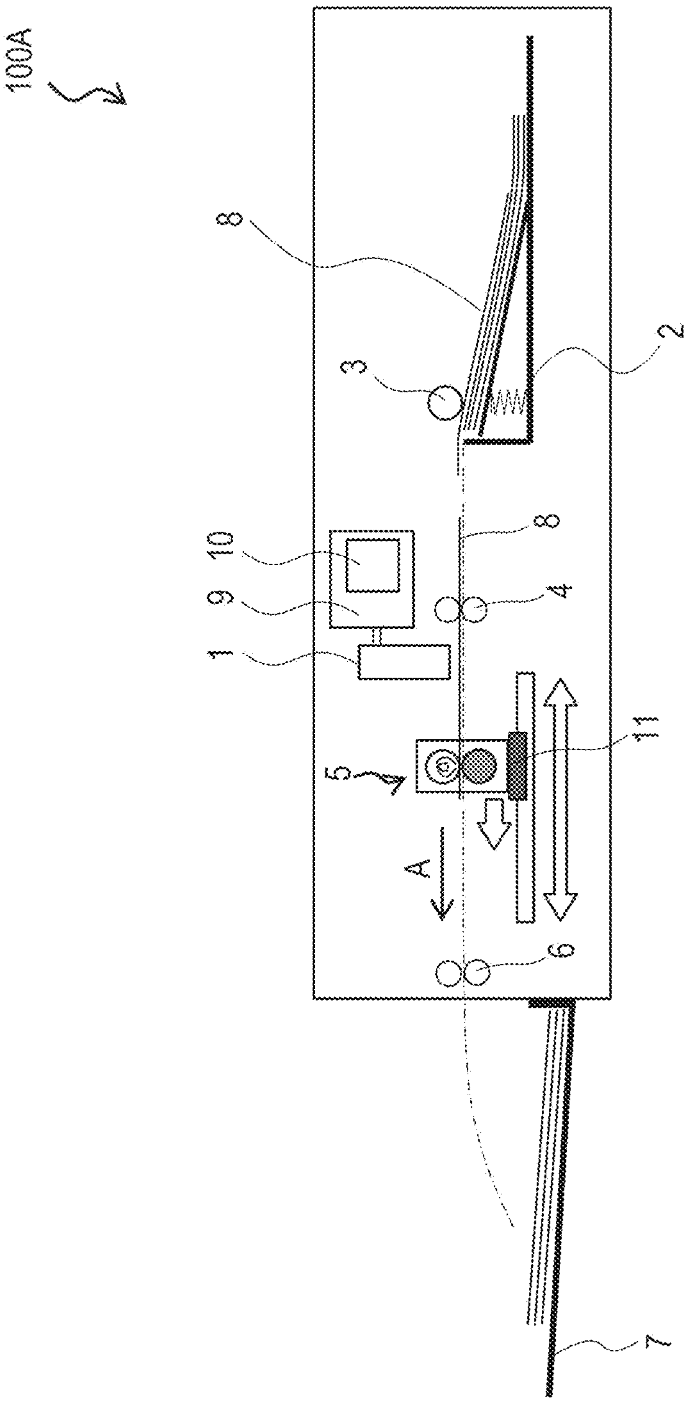
FIG. 6 is a diagram of an entire recording apparatus according to a fourth example embodiment.

A third example embodiment will now be herein described below with reference to FIG. 6. The differences from the first embodiment will be described below. A recording apparatus 100A according to the present embodiment has a slide rail 11 capable of moving the heating part 5 in the conveying direction of a recording medium 8. Thus, the relative positions of the heating part 5 and the recording head 1 can be changed in the present embodiment. The present embodiment is similarly configured to the first embodiment in other than the above points.

According to the present embodiment, a relative distance between the recording head 1 and the heating part 5 is changed thereby to adjust the amount of ink drop Id to be crushed. As stated above, as the time after an ink drop Id attaches on a recording medium 8 and until the recording medium 8 reaches the nip of the heating part 5 is shorter, the image density is higher (see FIG. 5).

According to the present embodiment, when the amount of ink drop Id to be crushed is to be increased, the heating part 5 on the slide rail 11 (example unit configured to change a relative position) is moved toward the upstream in the conveying direction of a recording medium 8 thereby to reduce the relative distance between the heating part 5 and the recording head 1. In this case, the time after an ink drop Id attaches a recording medium 8 and until the recording medium 8 reaches the nip of the heating part 5 is shorter by the shortened distance, and thus the amount of ink drop Id to be crushed can be increased. When the amount of ink drop Id to be crushed is to be decreased, the heating part 5 is moved toward the downstream in the conveying direction of a recording medium 8 thereby to decrease the amount of ink drop Id to be crushed. If the relative distance between the heating part 5 and the recording head 1 can be changed, the recording head 1 is placed on the slide rail 11 thereby to change the setting of relative distance between the heating part 5 and the recording head 1. The unit configured to change the relative distance between the heating part 5 and the recording head 1 may be other than the slide rail 11. That is, one of the recording head 1 and the heating part 5 may be changed relative to the other in its relative position in the conveying direction of a recording medium 8. From the above, according to the present embodiment, one of the recording head 1 and the heating part 5 is changed relative to the other in its setting of relative position thereby to adjust the amount of ink drop Id to be crushed.

The present embodiment is advantageous in that it can obtain the effects of the first embodiment without changing the conveying speed of a recording medium 8.

Fourth Example Embodiment

A fourth example embodiment will now be herein described below. The differences from the first embodiment will be described below. The recording apparatus (not illustrated) according to the present embodiment is configured such that the setting of temperature of the heater of the heat roller 5A configuring the heating part 5 or the setting of heating temperature can be changed by the engine control part 107 in the control part 9. The present embodiment is similarly configured to the first embodiment in other than the above point.

According to the present embodiment, the heating speed of a recording medium 8 by the heating part 5 is changed thereby to adjust the amount of ink drop Id to be crushed.

For example, in the comparative form, or when a recording medium 8 is not heated after an ink drop Id attaches on the recording medium 8 by the recording head 1, the ink on the surface of the recording medium 8 is not heated and dried. Thus, in the comparative form, most of the moisture in the ink remains on the surface of the recording medium 8 and the area factor increases (see FIG. 4). However, the increase in area factor can adversely affect the line width or character quality.

Thus, in the present embodiment, the heating temperature of the heating part 5 is changed thereby to adjust the amount of ink drop Id to be crushed in order to minimize an influence on the line width or character quality while efficiently increasing the area factor. Specifically, the temperature of the heater of the heat roller 5A is controlled by the control part 9 at an applied voltage and the setting of heating temperature of the heat roller 5A is changed thereby to adjust the amount of ink drop Id to be crushed. In the present embodiment, when the amount of ink drop Id to be crushed is to be increased, the heating speed of a recording medium 8 by the heating part 5 is changed to a lower heating temperature. In this case, the ink drop Id is difficult to dry due to the decrease in the heating temperature, thereby increasing the amount of ink drop Id to be crushed. When the amount of ink drop Id to be crushed is to be decreased, the heating speed of a recording medium 8 by the heating part 5 is changed to a higher heating temperature. In this case, the ink drop Id is easy to dry due to the increase in the heating temperature, thereby decreasing the amount of ink drop Id to be crushed. The adjustment may be determined on the basis of a result obtained by observing the area factor relative to the set heating temperature by a light microscope or scanner or measuring the density by a colorimeter, and observing a change in line width or character quality by the light microscope or scanner. The information on the optimized temperature set for the heater is recorded in the ROM 102, and the heating part 5 may be controlled by the control part 9 on the image forming operation.

The present embodiment is advantageous in that it can obtain the effects of the first embodiment without changing the conveying speed of a recording medium 8. The present embodiment is more advantageous than the first to third embodiments in that a balance between an increase in area factor and a line width or character quality due to the increase in area factor can be achieved.

Fifth Example Embodiment

A fifth example embodiment will now be herein described below. The differences from the first embodiment will be described below. The recording apparatus (not illustrated) according to the present embodiment is configured such that the setting of nip pressure of the heat roller 5A and the pinch roller 5B can be changed. The present embodiment is similarly configured to the first embodiment in other than the above point.

As described above, the amount of ink drop Id to be crushed depends on the amount of ink remaining on the surface of a recording medium 8. For example, when a recording medium is poorly-absorbable paper or unabsorbed paper with a relatively low ink permeation speed, if the nip pressure of the heat roller 5A and the pinch roller 5B is increased, the amount of ink drop Id to be crushed per unit time increases. When a recording medium is plain paper with a relatively high ink permeation speed, if the nip pressure is relatively increased, the ink permeation may be promoted. Thus, it is preferable to optimize the nip pressure in consideration of a balance between a plurality of standard nip pressures and the line width or character quality due to an increase in the area factor.

A unit configured to change the nip pressure is as follows, for example. When the unit is a spring (example changing part, not illustrated) pressing one of the heat roller 5A and the pinch roller 5B against the other, the spring pressure may be changed. When the unit is a motor (not illustrated) moving one of the heat roller 5A and the pinch roller 5B toward the other, the movement position of the one may be changed. In this case, the information on the optimized nip pressure for the type or installation environment of a recording medium 8 is recoded in the ROM 102, and the control part 9 controls the motor on the basis of the information thereby to adjust the amount of ink drop Id to be crushed.

The present embodiment is advantageous in that it can obtain the effects of the first embodiment with the relative positions of the heating part 5 and the recording head 1 kept. Particularly, the present embodiment is more advantageous than the first to third embodiments in that a balance between an increase in area factor and a line width or character quality due to the increase in area factor can be achieved irrespective of the type of a recording medium 8.

Sixth Example Embodiment

Figure 7:
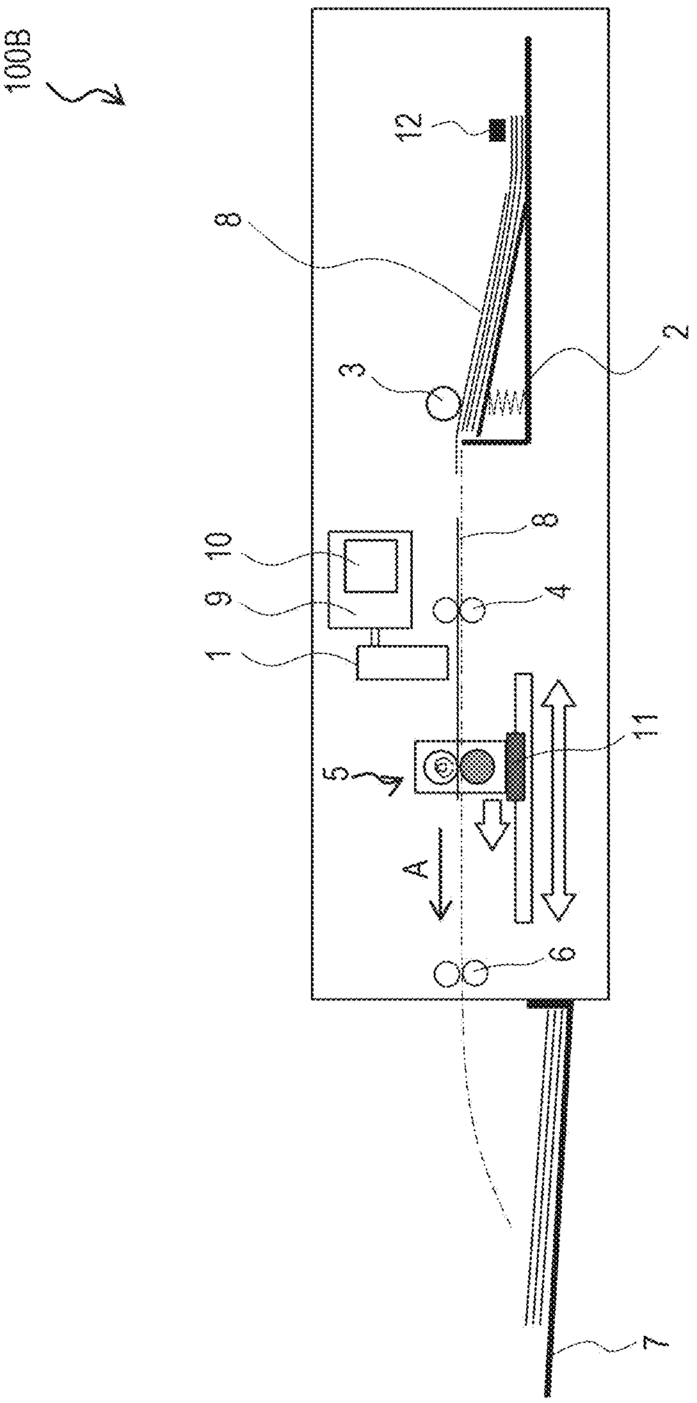
FIG. 7 is a diagram of an entire recording apparatus according to a sixth example embodiment.

A sixth example embodiment will now be herein described below. The differences from the third embodiment will be described below. A recording apparatus 100B according to the present embodiment has a paper type detection sensor 12 (example detection part) configured to detect the type of a recording medium 8 as illustrated in FIG. 7. The paper type detection sensor 12 optically detects a property due to a paper type on the basis of a spectral reflectivity. The present embodiment is similarly configured to the third embodiment in other than the above points.

Here, a light emitted by a light emitting device reflects on a recording medium 8 and the amount of the reflected light is detected by a light receiving device so that the paper type detection sensor 12 determines the type on the basis of the light amount level. Thus, when the amount of the reflected light is detected while the recording medium 8 stops or is at a very slow speed, the light amount level does not change and accurate detection is enabled. According to the present embodiment, the paper type detection sensor 12 is arranged above the paper feeding cassette 2, and thus the paper type detection sensor 12 can detect the paper type while a recording medium 8 stops. The paper type detection sensor 12 is described in detail in Japanese Patent Laid-Open No. 9-114267.

According to the present embodiment, the amount of ink drop Id to be crushed can be adjusted depending on the type of a recording medium 8. Various types of recording mediums 8 are assumed, and thus the amount (volume) of ink drop remaining on the surface of a recording medium 8 is different when the recording medium 8 passes through the heating part 5 due to the recording medium 8. Therefore, the amount of ink drop Id to be crushed is different due to the type of a recording medium 8.

Thus, according to the present embodiment, the type of a recording medium 8 is detected by the paper type detection sensor 12 thereby to adjust the amount of ink drop Id to be crushed such that the amount of ink drop Id to be crushed is within a desired range irrespective of the type of the recording medium 8.

For example, as a result of the detection by the paper type detection sensor 12, when a recording medium 8 with a relatively high ink permeation speed is employed, the heating part 5 on the slide rail 11 is moved toward the upstream in the conveying direction of the recording medium 8. Further, as a result of the detection by the paper type detection sensor 12, when a recording medium 8 with a relatively low ink permeation speed is employed, the heating part 5 on the slide rail 11 is moved toward the downstream in the conveying direction of the recording medium 8. The heating part 5 is moved by a movement unit (not illustrated) controlled by the control part 9, for example. In this case, the information on the optimized position of the heating part 5 for the type or installation environment of a recording medium 8 is recorded in the ROM 102, and the control part 9 may control the movement unit or the setting of position of the heating part 5 on the basis of the information.

The present embodiment applies the third embodiment thereby to adjust the amount of ink drop Id to be crushed depending on the type of a recording medium 8, but is not limited thereto. For example, as described for the third embodiment, the recording head 1 may be moved by the slide rail 11. The present embodiment may apply the second embodiment thereby to adjust the amount of ink drop Id to be crushed depending on the type of a recording medium 8. The type of a recording medium 8 is detected by the paper type detection sensor 12 according to the present embodiment, but the present embodiment is not limited thereto. For example, the type of a recording medium 8 is selected from the touch panel of the operation part 10 by a user operation or the information such as basis weight is directly input thereby to temporarily store the information on the type of the recording medium 8 in the RAM 103. Additionally, the control part 9 may change the position of the heating part 5 in the present embodiment and the position of the recording head 1 or the conveying speed of the recording medium 8 in a variant such that the desired amount of ink drop Id to be crushed is achieved on the basis of the temporary storage in the RAM 103.

The present embodiment is more advantageous than the first to third embodiments in that it can achieve a balance between an increase in area factor and a line width or character quality due to the increase in area factor irrespective of the type of a recording medium 8.

Seventh Example Embodiment

A seventh example embodiment will now be herein described below. The configuration of the recording apparatus (not illustrated) in the present embodiment is the same as (or similar) to the first embodiment.

As described above, as the time after an ink drop Id attaches on a recording medium 8 and until the recording medium 8 reaches the nip of the heating part 5 is shorter, the image density is higher (see FIG. 5). That is, when an ink drop Id can pass through the heating part 5 after the ink drop Id attaches on the surface of a recording medium 8 and before it permeates the inside of the recording medium 8, effects caused by an increase in area factor due to the crushed ink drop Id, or the effects of the first embodiment are expected.

However, an ink drop Id may not pass through the heating part 5 after the ink drop Id attaches on the surface of a recording medium 8 and before it permeates the inside of the recording medium 8. For example, this is when an ink with a high permeation speed into a recording medium 8 or a relatively low surface tension is used or when a recording medium 8 with a relatively high permeation speed after attachment of an ink drop Id is employed. In the cases, the effects of the first to sixth embodiments are difficult to obtain.

Thus, in the above cases, according to the present embodiment, the ink is sufficiently dried or an entire ink drop Id is completely dried when the ink is attached on a recording medium 8 and then the recording medium 8 passes through the heating part 5.

The timings to dry correspond to elapsed times $t_1$ to $t_2$ [s] in FIG. 4, for example, and in this case, it is preferable that an ink drop Id is completely dried at elapsed time closer to $t_1$ [s] which is soon after the ink drop Id starts permeating the inside of a recording medium for better effects in the present embodiment. With the configuration, according to the present embodiment, it is possible to restrict a color material from permeating the inside of a recording medium 8 after the recording medium 8 passes through the heating part 5. Thereby, it is possible to restrict a reduction in color developing due to permeation of an ink according to the present embodiment.

The disclosure has been described above by way of the respective embodiments, but the technical scope of the disclosure is not limited to the respective embodiments described above. The disclosure is not limited to only the respective embodiments, and can be modified as needed within the scope of WHAT IS CLAIMED IS and its equivalent scope without departing from the technical spirit of the disclosure.

The recording head 1 according to each embodiment has been described as full-line type head, but the recording head 1 may be of serial type. For example, when forming an image, the serial type recording apparatus performs recording while the recording head is moving forward and backward in a predetermined direction. Since the scanning direction of the carriage is orthogonal to the conveying direction of a recording medium in the serial type recording apparatus, the seral type head takes a longer time to enter the heating part 5 after recording than the full-line type head. However, the first to sixth embodiments are applicable if an ink drop Id is present on the surface of a recording medium 8 when the recording medium 8 reaches the heating part 5. In this case, the serial type recording apparatus is applicable when a recording medium 8 with lower ink permeation such as poorly-absorbable paper or unabsorbed paper is used. To the contrary, the seventh embodiment is applicable if an ink drop Id is not present on the surface of a recording medium 8 when the recording medium 8 reaches the heating part 5.

Each example embodiment has been described by way of single-side printing, but each embodiment is applicable to double-sided printing.

Each example embodiment has been described assuming that a recording medium 8 is cut paper, but roll paper and fanfold paper may be employed instead of cut paper.

A plurality of recording heads 1 may be provided corresponding to a plurality kinds of ink with different recording colors and densities. For example, the recording apparatus may include not only a recording mode for main color such as black but also at least one recording mode for complex color by different colors or full color by mixed colors. A preliminary discharge control value selected from each recording head is subjected to different weighting thereby to perform preliminary discharge control in consideration of a difference in ingredients in an ink drop Id discharged from each recording head.

Ink may mainly contain a color material (dye or pigment) and a solvent. The solvent may be water-based material or oil-based material. The dye is preferably a water-soluble dye such as direct dye, acid dye, basic dye, reactive dye, and food dye, and may be any dye capable of providing an image meeting the required performances such as fixability, color developability, vividness, stability, and light resistance in combination with the above recording medium. The pigment is preferably carbon black. A method using both a pigment and a dispersant, a method using a self-dispersible pigment, and a microencapsulation method can be also employed. Further, a solvent component or various additives such as solubilizer, viscosity adjuster, surfactant, surface tension modifier, pH adjuster, and resistivity adjuster may be added to ink to be used.

As described above, the disclosure has been described by way of the first to seventh embodiments in the present specification, but combinations of some or all of the example embodiments are included in the technical scope of the disclosure.

The liquid discharge apparatus according to the disclosure can increase an image density with a less amount of droplets while improving a drying speed of droplets attached on a medium.

While the disclosure has been described with reference to example embodiments, it is to be understood that the disclosure is not limited to the disclosed example embodiments. The scope of the following claims is to be accorded the broadest interpretation so as to encompass all such modifications and equivalent structures and functions.

What is claimed is:

1. A liquid discharge apparatus comprising:

a conveying unit configured to convey a medium in a conveyance direction;

a discharge head configured to discharge liquid onto the medium conveyed by the conveying unit;

a controller configured to perform a first control of heating the medium at a first position and not heating the medium at a second position different from the first position and a second control of heating the medium at the second position and not heating the medium at the first position.

2. The liquid discharge apparatus according to claim 1, wherein the second position is arranged at a downstream of the first position in the conveyance direction.

3. The liquid discharge apparatus according to claim 1, wherein the first position is a position which is located at a first distance from the discharge head, and wherein the second position is a position which is located at a second distance from the discharge head, the second distance being larger than the first distance.

4. The liquid discharge apparatus according to claim 1, wherein the controller is able to change a conveying speed at which the conveying unit conveys the medium.

5. The liquid discharge apparatus according to claim 4, wherein the controller changes the conveying speed on a basis of a type of the medium.

6. The liquid discharge apparatus according to claim 1, wherein the controller performs either the first control or the second control on a basis of a type of the medium.

7. The liquid discharge apparatus according to claim 1, wherein the controller is configured to receive information from a host apparatus to which the controller connects.

8. The liquid discharge apparatus according to claim 1, further comprising a detection unit configured to detect a type of the medium.

9. The liquid discharge apparatus according to claim 1, further comprising an input unit enabling to input a type of the medium.

10. The liquid discharge apparatus according to claim 1, wherein the liquid discharge apparatus is configured to discharge a plurality of types of liquid onto the medium, and further comprises a plurality of discharge heads each being the discharge head and each corresponding to a different one of the plurality of types of liquid.

11. The liquid discharge apparatus according to claim 1, wherein the discharge head is a full-line type head.

12. The liquid discharge apparatus according to claim 1, wherein the discharge head is configured to perform recording with being moved forward and backward by a moving unit.

13. The liquid discharge apparatus according to claim 1, wherein the medium is a cut sheet.

14. The liquid discharge apparatus according to claim 1, wherein the medium is a roll sheet.

15. A liquid discharge apparatus comprising:

a conveying unit configured to convey a medium in a conveyance direction;

a discharge head configured to discharge liquid onto the medium conveyed by the conveying unit;

a heating unit configured to heat the medium in a first area in which a relative distance from the discharge head is a first distance and in a second area in which a relative distance from the discharge head is a second distance which is smaller than the first distance, and a switching unit configured to switch between causing the heating unit to heat the medium in the second area and causing the heating unit not to heat the medium in the second area.

16. The liquid discharge apparatus according to claim 15, wherein the heating unit is arranged at a downstream of the discharge head in the conveyance direction.

17. The liquid discharge apparatus according to claim 15, wherein a conveying speed of the medium conveyed by the conveying unit is changeable.

18. A method for controlling a liquid discharge apparatus including a conveying unit configured to convey a medium in a conveyance direction and a discharge head configured to discharge liquid onto the medium conveyed by the conveying unit, the method comprising:

performing a first control of heating the medium at a first position and not heating the medium at a second position different from the first position, and performing a second control of heating the medium at the second position and not heating the medium at the first position.

19. The method according to claim 18, wherein the second position is arranged at a downstream of the first position in the conveyance direction.

20. The method according to claim 18, wherein the first position is a position which is located at a first distance from the discharge head, and wherein the second position is a position which is located at a second distance from the discharge head, the second distance being larger than the first distance.

21. The method according to claim 18, further comprising performing a third control of changing a conveying speed at which the conveying unit conveys the medium.

22. The method according to claim 21, wherein the third control is performed on a basis of a type of the medium.

23. The method according to claim 18, wherein, on a basis of a type of the medium, either the first control or the second control is performed.

24. The method according to claim 18, wherein the liquid discharge apparatus is configured to receive information from a host apparatus.

25. A heating method performed by a liquid discharge apparatus including a conveying unit configured to convey a medium in a conveyance direction, a discharge head configured to discharge liquid onto the medium conveyed by the conveying unit, and a heating unit for heating the medium, wherein the medium is heated in a first area in which a relative distance from the discharge head is a first distance and in a second area in which a relative distance from the discharge head is a second distance which is smaller than the first distance, the method comprising:

switching between causing the heating unit to heat the medium in the second area and causing the heating unit not to heat the medium in the second area.

26. The heating method according to claim 25, wherein the medium is heated at a downstream of the discharge head in the conveyance direction.

27. The heating method according to claim 25, further comprising changing a conveying speed at which the conveying unit conveys the medium.

28. The heating method according to claim 25, further comprising detecting a type of the medium.

29. The heating method according to claim 25, further comprising causing a user to input a type of the medium to an input unit.

* * * * *